(12) United States Patent
Mudel et al.

(10) Patent No.: US 7,946,781 B2
(45) Date of Patent: May 24, 2011

(54) ASSEMBLY AND METHOD FOR RETAINING A FASTENER

(75) Inventors: Roman Mudel, Novi, MI (US); Robert J. Moran, Ann Arbor, MI (US); Thomas Richard Durkin, Oxford, MI (US); Iain J. Read, Warren, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 292 days.

(21) Appl. No.: 12/100,043

(22) Filed: Apr. 9, 2008

(65) Prior Publication Data

US 2009/0257822 A1 Oct. 15, 2009

(51) Int. Cl.
*B25G 3/00* (2006.01)
(52) U.S. Cl. ............. 403/16; 403/12; 411/103; 411/999
(58) Field of Classification Search .............. 403/12–14, 403/16, 343, 279; 411/103, 107, 539, 999; 269/60, 66
See application file for complete search history.

(56) References Cited

U.S. PATENT DOCUMENTS

| 3,342,097 | A | * | 9/1967 | Rocheleau | 411/76 |
| 3,844,194 | A | * | 10/1974 | Reinwall | 411/76 |
| 4,605,350 | A | * | 8/1986 | Chater et al. | 411/75 |
| 4,859,118 | A | * | 8/1989 | Schaeffer | 405/259.3 |
| 6,027,293 | A | * | 2/2000 | Beemer et al. | 411/119 |
| 6,146,076 | A | * | 11/2000 | Bodin | 411/433 |
| 6,322,274 | B1 | * | 11/2001 | Binotti et al. | 403/13 |
| 7,175,209 | B2 | * | 2/2007 | Cetnar et al. | 292/100 |
| 2004/0247386 | A1 | * | 12/2004 | Sugiyama et al. | 403/408.1 |
| 2008/0245599 | A1 | * | 10/2008 | Batdorff et al. | 180/311 |

* cited by examiner

*Primary Examiner* — Joshua T Kennedy
(74) *Attorney, Agent, or Firm* — Quinn Law Group, PLLC

(57) ABSTRACT

An assembly for connecting a component having a base to a surface includes a fastener and a retainer having a clamp portion for capturing a shank of the fastener, and for aligning the fastener and an optional gasket with the base. The retainer automatically separates from the fastener when the fastener is tightened, and may include a recovery feature to allow recovery of the retainer after separation. A method for facilitating connection of a component and gasket to a surface includes inserting a threaded fastener into a base of the component, capturing the fastener within a clamp portion of a retainer, and positioning a surface of the retainer adjacent to the base. A tab portion of a gasket or the base can be inserted into a slot in the retainer to thereby secure the retainer to the base prior to connecting the component to the surface.

5 Claims, 2 Drawing Sheets

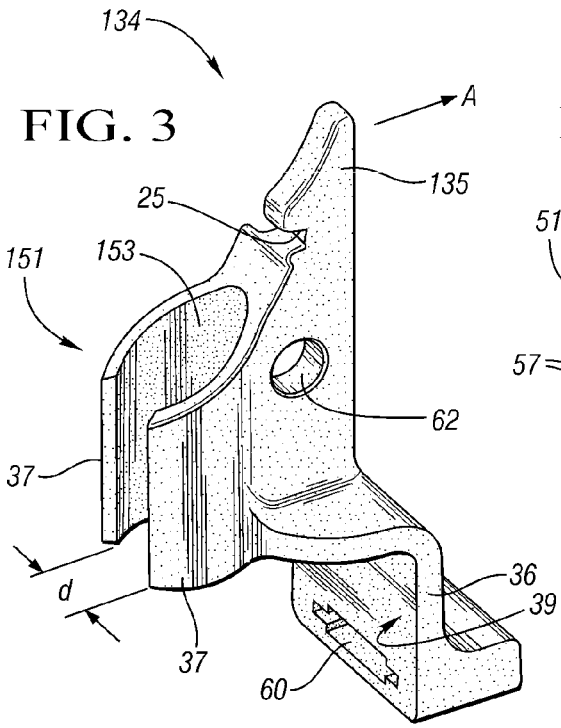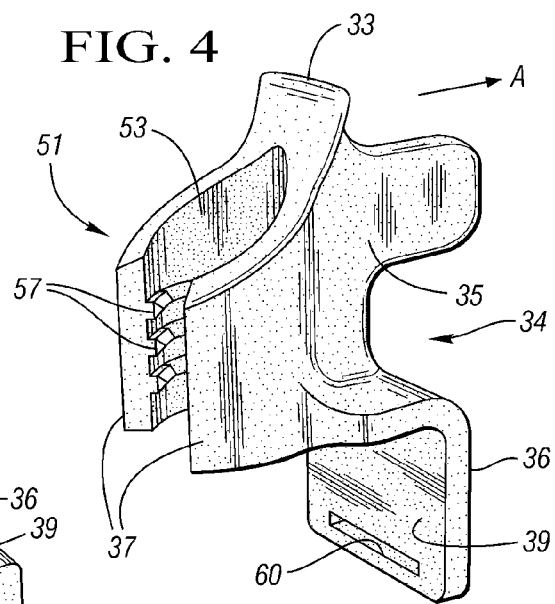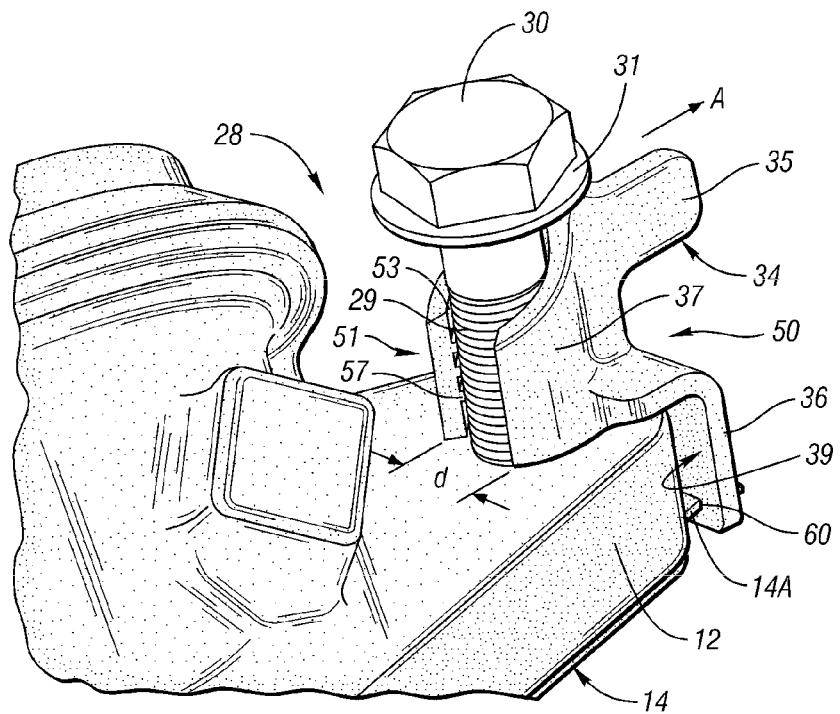

ASSEMBLY AND METHOD FOR RETAINING A FASTENER

TECHNICAL FIELD

The present invention relates to an assembly and a method for temporarily retaining a fastener with respect to a component prior to attachment of the component to a surface to thereby facilitate installation of the component into a restricted space or area.

BACKGROUND OF THE INVENTION

Physical access to various components and areas of an assembly or system during the manufacturing process may be limited or restricted. For example, the connection or attachment of engine components to a surface of an engine can pose a challenge due to the minimal available space and/or limited clearance between previously installed components within the engine compartment. Likewise, the installation of a flexible air or liquid conduit or other devices within a relatively compact system, whether automotive in nature or otherwise, may be relatively difficult to achieve in an efficient manner.

In order to facilitate the positioning of mating pieces or components within such a limited space during assembly, locator tabs are sometimes used on the mating components. For example, a gasket or seal can be configured with internal tabs or teeth which directly mesh with threads of a fastener shank. However, an interference fit retention method can be less than optimal for certain purposes or with certain applications, such as when there is minimal protrusion of the fastener shank into the connected and/or retained component. Other devices such as Axi-Rad® thermoplastic retainers can be used to capture fasteners. However, such devices leave the retainer in place as part of the component after installation, and therefore are less than optimal for certain purposes. For instance, permanent fasteners can require modifications to the component, and also may be less than optimal when used in certain high-temperature applications.

SUMMARY OF THE INVENTION

Accordingly, an assembly is provided for connecting a component to a surface of a larger or parent system. The assembly includes a fastener for connecting the component to the surface, and a retainer for temporarily capturing the fastener and securing the assembly to the component prior to and during assembly. The retainer can be secured or retained to the component, such as to a generally flat base or plate of the component, using a tab portion or extension of the component, or a tab portion of a gasket of the type often used for sealing an interface between the component and the surface to which the component is to be attached. In this manner, the fastener, the retainer, and the component are temporarily retained with respect to each other during transport of the component, and/or during installation of the component into the parent system, thereby aligning the fastener and the component to facilitate installation. The retainer automatically separates from the fastener and the component when the fastener is tightened during connection of the component to the surface.

The component can be any component having a generally flat portion, such as a plate or base. The component can be, but is not limited to, a flange assembly such as might be used for connecting different parts of an exhaust gas collection device within a vehicle. When the component is configured as a flange assembly for such an exhaust collection device, the surface can be an engine surface such as a cylinder head or other vehicle surface or surfaces. However the component itself is configured, the fastener is a threaded bolt having a shoulder or a permanent washer, and the retainer includes a notch adapted for receiving the washer to further capture the fastener. The retainer includes a clamp portion, which can have a generally C-shaped profile or another clamp configuration or style suitable for capturing a shank or shaft of the fastener. The clamp portion can include a set of teeth or tabs for engaging the threads of the shank, depending on the particular embodiment.

The retainer includes a slot which is suitably sized and/or shaped for capturing a tab portion of either the base of the component or a gasket in order to further secure the retainer to the component. The retainer is automatically separated from the fastener and the component during installation of the component by contact with a driver head and/or the fastener head and/or washer. The retainer can include a recovery feature such as a through-hole and cable or another suitable feature for recovering the retainer after the retainer is separated during assembly.

The retainer includes a middle portion for capturing a threaded shank of the fastener, a lower portion for capturing a tab portion of a gasket or of the component, and an upper portion. The upper portion is forced in one direction by the fastener and/or driver head when the fastener is tightened during connection of the component to a surface. Movement of the upper portion automatically separates the middle portion from the threaded shank and the lower portion from the tab portion.

A method is also provided for facilitating the connection of a component to a surface. The method includes inserting a threaded fastener at least partially into a plate or base of the component, capturing the threaded fastener within a clamp portion of a retainer, positioning a surface of the retainer adjacent to the base, and inserting a tab or extension of either of the base or a gasket into a slot formed in the retainer. In this manner, the retainer is retained or secured with respect to the base prior to connecting the component to the surface. The fastener is tightened to connect the component to the surface, with the tightening of the fastener forcing the retainer away from the fastener and the tab portion to thereby separate the retainer from the component.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a perspective view of a retainer usable with the assemblies shown in FIGS. 1 and 2;

FIG. 4 is a perspective view of an alternate retainer usable with the assemblies of FIGS. 1 and 2; and FIG. 5 is a perspective view of a portion of the component of FIG. 1.

DESCRIPTION OF THE PREFERRED EMBODIMENTS

Figure 1:
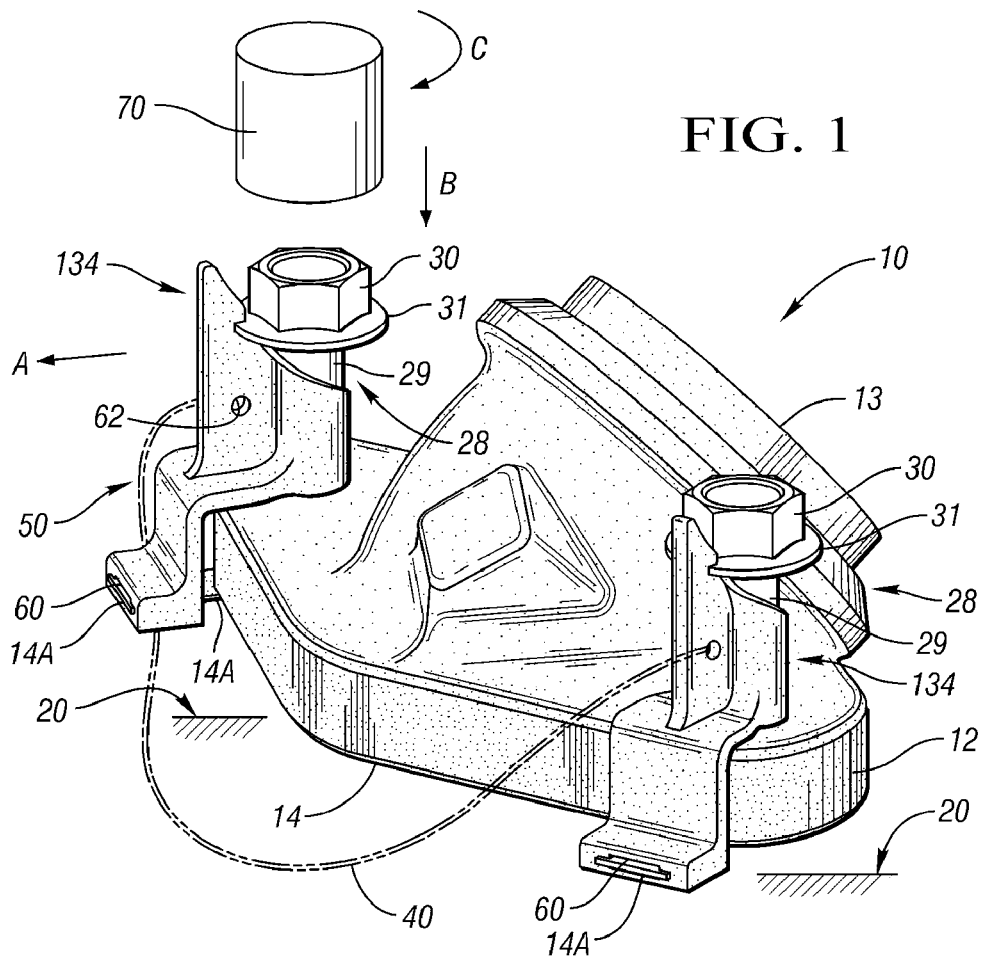
FIG. 1 is a perspective view of a representative component having a base and an assembly for temporarily retaining a fastener to the component in accordance with the invention.

Referring to the drawings wherein like reference numbers correspond to like or similar components throughout the several figures, there is shown in FIG. 1 a component 10 suitable for joining or connecting different parts, devices, surfaces within a larger or parent system. The component 10 includes a generally flat plate or base 12, and may also include a circular opening or flange 13 depending on the particular application. The base 12 of the component 10 can be connected or attached to a surface 20 of, for example, an engine, a vacuum system, a fluid system, an air conditioning, heating, and ventilation (HVAC) system, or any other suitable system having a surface 20 which is connectable or attachable to such a base 12.

Figure 2:
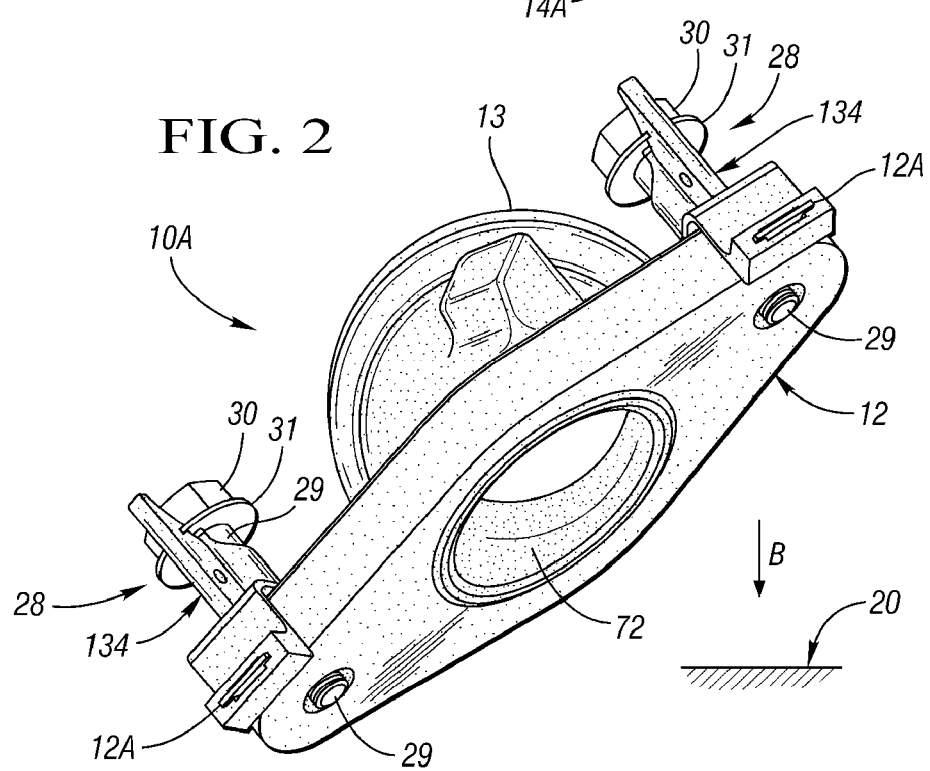
FIG. 2 is a perspective view of the representative component of FIG. 1 according to another embodiment.

In order to facilitate such a connection, particularly within a relatively limited or restricted space, an assembly 50 is provided having a retainer 134 and a fastener 28. The retainer 134, or the alternate retainer 34 of FIGS. 3 and 5 described below, is molded, formed, or constructed of an injection-molded plastic or another suitable and at least partially flexible material, with the retainer 134 temporarily capturing and/or retaining the fastener 28 to the component 10 during transport, and/or during attachment of the component 10 to a surface 20 of a larger or parent system (not shown). The retainer 134 is further captured or secured to the component 10 using an extension or a tab portion 14A of a gasket 14, which is inserted into a slot 60 formed in the retainer 134 as shown in FIG. 1. Alternately, if such a gasket 14 is not used in the particular application, an extension or tab portion 12A of the base 12 or other suitable portion of the component 10 can be used, as shown in FIG. 2.

In one embodiment, the fastener 28 is a flange-head bolt of the type known in the art, i.e., having a shoulder or washer 31 adjacent to a head 30, such as a hex head or other suitable head design. The fastener 28 includes a threaded shaft or shank 29. The retainer 134 captures the fastener 28 at or around the shank 29 as described below with reference to FIG. 3, and aligns the fastener 28 with the base 12 prior to installation. When the component 10 is installed, the fastener 28 is tightened in the direction of arrow B using a wrench or driver 70 or other suitable device, which is rotated using an appropriate amount of torque as indicated generally by arrow C. Tightening of the fastener 28 ultimately forces the driver 70, the washer 31, and/or the head 30 into direct contact with the retainer 134, thus forcing or moving the retainer 134 in the direction of arrow A, i.e., away from the fastener 28, to automatically separate or detach the retainer 134 from the component 10 at the base 12. Once separated, an optional recovery feature 62 can be used to recover or collect the retainer 134. For example, a length of cable 40, or alternately a wire, chain, or other suitable device can connect to each retainer 134 used with the component 10.

The surface 20 can be a surface of a cylinder head of an internal combustion engine, or any other suitable surface within a vehicle (not shown), with the component 10 and any necessary castings, bellows, conduit, or other parts capturing and directing any high temperature exhaust expelled from the cylinder head and directing the exhaust gas as needed. However, the surface 20 is not intended to be limited to this particular embodiment, as those of ordinary skill in the art can readily envision other parent systems and surfaces 20 within the scope of the invention. For example, the component 10 can connect to a surface 20 of a heating and/or air conditioning duct, to a pump or other fluid power source, to a vacuum chamber of a vacuum assembly, and/or any other suitable parent system, whether automotive, consumer, commercial, or otherwise, which might use such a base 12 and one or more fasteners 28 as described above with reference to FIGS. 1 and 2.

Regardless of the particular configuration and function of the parent system within which the surface 20 is found, at least one base 12 is rigidly connectable to the surface 20 using one or more fasteners 28. A seal or gasket 14 can be positioned at or along a boundary between the base 12 and the surface 20 if needed in order to provide a sufficient type and amount of sealing capability between the base 12 and the surface 20. The gasket 14 can be constructed of multi-layered steel (MLS) of the type known in the art in order to provide sufficient sealing capability in the presence of high-temperatures, such as when used an exhaust collection system as described above, although other materials may be used for the gasket 14 depending on the particular sealing environment.

Referring to FIG. 2, an alternate component 10A is substantially identical to the component 10 of FIG. 1, although shown from a different perspective, and with the component 10A not including a gasket 14 (see FIG. 1). Such an embodiment might be used, for example, in applications wherein the base 12 is used primarily for mounting a component 10 in the direction of arrow B to an opposing surface 20 without requiring a gasket 14 or any type of fluid seal therebetween, but when it is still desirable to have the fasteners 28 secured with respect to the component 10A. The component 10A includes an opening 72 which is in communication with the flange 13 through the base 12. In this embodiment, a tab portion 12A of a suitable part of the component 10A, such as the base 12, is used instead of the tab portion 14A of a gasket 14 (see FIG. 1) to further secure the retainer 134 to the component 10A.

Referring to FIG. 3, the retainer 134 includes a clamp portion 151 having a generally C-shaped cross sectional profile, i.e., with a pair of opposing sides or ribs 37 separated by a distance "d". The clamp portion 151 is adapted for capturing or receiving the threaded shank 29 of the fastener 28 (see FIGS. 1 and 2) between the ribs 37. Each rib 37 has an inner surface 153 which is positioned adjacent to the threaded shank 29 of the fastener 28 (see FIGS. 1 and 2) when the fastener 28 is captured therein. In the embodiment of FIG. 3, the inner surface 153 is substantially smooth, i.e., does not interfere with the threads of the shank 29 (see FIGS. 1 and 2). However, as shown in FIG. 4 below, an interference fit with the various threads of the shank 29 can be provided as an alternate design or configuration.

The retainer 134 includes an upper portion 135 and a lower portion 36 each formed integrally with or connected to a middle portion, i.e., the ribs 37. The lower portion includes a slot 60 which receives or captures an extension or a tab portion 14A of the gasket 14 (see FIG. 1), or alternately a tab portion 12A of the base 12 (see FIG. 2). As will be understood by those of ordinary skill in the art, a gasket 14 (see FIG. 1) is often configured with such a tab portion 14A in order to facilitate the quality inspection of the gasket 14 after its installation, and when most of the surface area of the gasket 14 is hidden from view. The retainer 134 can therefore be configured to take advantage of an existing tab portion 14A, or absent a gasket 14, a tab portion 12A of the component 10A (see FIG. 2).

An inner surface 39 of the lower portion 36 is positioned adjacent to the base 12 (see FIGS. 1 and 2), and the fastener 28 is partially threaded or installed into the base 12 prior to installing the base 12 and the component 10, 10A (see FIGS. 1 and 2, respectively) into a larger or parent system (not shown). In this manner, the assembly 50 (see FIGS. 1 and 2) and the component 10 can be packaged and shipped as a single unit, with a sufficient number of the retainers 134 retaining the fasteners 28 with respect to the base 12. When the upper portion 135 is moved in the direction of arrow A as described above, the retainer 134 automatically separates from the fastener 28 and component 10, 10A (see FIGS. 1 and 2). The recovery feature 62 can then be used to facilitate recovery of the retainer 134 after separation, as described below with reference to FIG. 1.

Referring to FIG. 4, an alternate retainer 34 includes the ribs 37 for capturing the fastener 28 (see FIGS. 1 and 2) in one manner, as described above. The retainer 34 includes integral upper portions 33 and 35 which are pushed, forced, or otherwise moved in the general direction of arrow A by contact with the washer 31 (see FIGS. 1 and 2) to thereby automatically separate the retainer 34, as with retainer 134 described above with reference to FIG. 3. The lower portion 36 includes the slot 60 for capturing either tab portion 14A (see FIG. 1) or 12A (see FIG. 2) as described above. In this embodiment, the retainer 34 has a plurality of tabs, threads, or teeth 57 for engaging or meshing with the threads of the shank 29 (see FIGS. 1, 2, and 4) to capture the fastener 28 (see FIGS. 1, 2, and 4) in another manner. The height, width, and or distance d of the ribs 37, in each of the embodiments of FIGS. 4 and 5, can be modified as needed depending on the size of the fastener 28 to be used therewith.

As will be understood by those of ordinary skill in the art, other features or aspects of the embodiment of FIG. 4 may altered as needed depending on the particular application, and/or combined with features of the embodiment of FIG. 3. For example, the lower portion 36 of FIG. 4 can be a substantially straight extension as shown, or an L-shaped profile as shown in FIG. 3, depending on the particular strength requirements and/or packaging limitations of the application. Likewise, the slot 60 can be a straight slot as shown in FIG. 4, a cross-shaped slot as shown in FIG. 3, or another shape, size, and/or configuration depending on the features of the tab portion 12A or 14A (see FIGS. 1 and 2) to be inserted therein. The upper portions 33 and 35 of FIG. 4 can be configured to substantially match the notch 25 and upper portion 135 of FIG. 3, depending again on packaging space or other limits, such as to further facilitate any movement of the upper portions 33 and 35 in the direction of arrow A. Also, the inner surface 153 of FIG. 3 can be modified to include the teeth 57 of FIG. 4, or the teeth 57 of FIG. 4 can be configured as a smooth surface as shown in FIG. 3, as needed, without departing from the intended scope of the invention.

Referring to FIG. 5, the retainer 34 is shown in one possible application as it would appear when secured to the base 12 using a tab portion 14A of the gasket 14. The ribs 37 capture the shank 29 of the fastener 28, and when the head 30 is tightened, the upper portions 33 (see FIG. 4) and 35 move in the direction of arrow A as described above. As the fastener 28 continues to be tightened, the ribs 37 moves away from the shank 29, which then passes through a gap between the ribs 37 as represented by the distance "d". As the retainer 34 continues to be moved or forced in the direction of arrow A, the tab portion 14A (or 12A, if a gasket 14 is not used as with FIG. 2) remains stationary, and the retainer 34 is automatically separated from the base 12, the gasket 14, and the fastener 28.

In this manner, each retainer 134 aligns and/or retains a different fastener 28 with respect to the base 12. If a gasket 14 is used, the retainer 134 properly positions and/or aligns the gasket 14 with both the fastener 28 and the base 12 as needed, thereby facilitating installation of the component 10 (see FIGS. 1 and 2) in a limited space environment as explained previously hereinabove. To facilitate recovery of the various retainers 134 after installation of the component 10, each retainer 134 can be provided or configured with a recovery feature 62, such as a through-hole as shown, or alternately a clip, eye, hook, or other suitable feature. One or more lengths of routed or directed cable 40, and/or a zip tie, chain, wire, or another suitable connection means, can be used to link or connect the various retainers 134, thus making it easier to collect the retainers 134 after separation of the retainers 134 from the component 10 as described below.

While the best modes for carrying out the invention have been described in detail, those familiar with the art to which this invention relates will recognize various alternative designs and embodiments for practicing the invention within the scope of the appended claims.

The invention claimed is:

1. An assembly comprising:
    a component having a base, wherein the base is connectable to a surface;
    a gasket adapted for sealing an interface between the base and the surface, wherein the gasket and the base includes a tab portion;
    a fastener having a shank; and
    a retainer that temporarily retains the fastener to the component, the retainer having a clamp defined by a generally C-shaped cross section which captures the shank of the fastener, and a slot which receives the tab portion and thereby temporarily secures the fastener and the retainer to the base;
    wherein a tightening of the fastener forces the fastener into direct contact with a top surface of the retainer, causing the retainer to separate laterally from the fastener and the component base to automatically detach the retainer from the component such that the fastener is capable of being fully tightened to connect the component to the surface.

2. The assembly of claim 1, wherein the component is an exhaust gas collection device for a vehicle, and wherein the surface is an engine surface.

3. The assembly of claim 1, wherein the fastener is a bolt having a flange head, and wherein the retainer includes a notch adapted for receiving the flange head.

4. The assembly of claim 1, further comprising a cable, wherein the retainer includes a through-hole that receives the cable and thereby facilitates a recovery of the retainer after the retainer has been fully separated from the fastener.

5. The assembly of claim 1, wherein the gasket includes the tab portion, and wherein the slot receives the tab portion of the gasket to thereby secure the retainer to the base.

* * * * *